(12) United States Patent
Park et al.

(10) Patent No.: US 7,903,951 B2
(45) Date of Patent: Mar. 8, 2011

(54) METHOD OF AND APPARATUS FOR RECORDING VIDEO DATA, AND INFORMATION STORAGE MEDIUM THEREBY

(75) Inventors: Sung-wook Park, Seoul (KR); Jung-wan Ko, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1458 days.

(21) Appl. No.: 10/255,083

(22) Filed: Sep. 26, 2002

(65) Prior Publication Data
US 2003/0072557 A1    Apr. 17, 2003

(30) Foreign Application Priority Data

Sep. 27, 2001 (KR) .................................. 2001-60239
Aug. 31, 2002 (KR) .................................. 2002-52287

(51) Int. Cl.
*H04N 5/84* (2006.01)

(52) U.S. Cl. ......... 386/335; 386/332; 386/326; 386/333; 386/334

(58) Field of Classification Search ................ 386/95, 386/124–125, 111–112, 335, 332, 326, 333, 386/334
See application file for complete search history.

(56) References Cited

U.S. PATENT DOCUMENTS

| | | | | |
|---|---|---|---|---|
| 5,570,340 A | * | 10/1996 | Lee et al. | 369/47.31 |
| 6,999,674 B1 | * | 2/2006 | Hamada et al. | 386/95 |
| 7,072,573 B2 | * | 7/2006 | Okada et al. | 386/95 |
| 7,123,818 B2 | * | 10/2006 | Nakatani et al. | 386/97 |
| 7,184,648 B1 | * | 2/2007 | De Haan | 386/95 |
| 7,738,776 B2 | * | 6/2010 | Kato et al. | 386/95 |
| 2001/0043790 A1 | * | 11/2001 | Saeki et al. | 386/65 |
| 2008/0253742 A1 | * | 10/2008 | Hamada et al. | 386/95 |

FOREIGN PATENT DOCUMENTS

| | | |
|---|---|---|
| CN | 1115089 | 1/1996 |
| HU | 215 622 B | 1/1999 |
| HU | 215622 | 1/1999 |
| HU | 216 451 B | 6/1999 |
| HU | 216451 | 6/1999 |
| JP | 03-169180 | 7/1991 |

(Continued)

OTHER PUBLICATIONS

Notice of Allowance issued in Korean Patent Application No. 10-2002-52287 on Oct. 30, 2008.

(Continued)

*Primary Examiner* — Thai Tran
*Assistant Examiner* — Helen Shibru
(74) *Attorney, Agent, or Firm* — NSIP Law

(57) ABSTRACT

Method of and apparatus for recording video data on an information storage medium, and an information storage medium thereby recording the video data in a digital video (DV) format received from a camcorder in a plurality of clip files, recording navigation data to navigate the clip files in a clip navigation file, recording a program navigation file which represent at least one of the clip files and at least a part of the corresponding clip navigation file, and recording program information which represents at least one of the program navigation file, in a manager file. The video data in a format of digital video (DV) provided by the camcorder can be recorded on the information storage medium on which the video data can be randomly accessed, and the video data can be reproduced at a desired time.

30 Claims, 6 Drawing Sheets

FOREIGN PATENT DOCUMENTS

| | | |
|---|---|---|
| JP | 10-11952 | 1/1998 |
| WO | WO 01/01681 A1 | 1/2001 |

OTHER PUBLICATIONS

Office Action issued by the Patent Office of the People's Republic of China in Chinese Patent Application No. 02822431.1 on Dec. 29, 2006.

Hungarian Office Action issued on Nov. 29, 2004, in counterpart Hungarian Application No. P 04 01956 including Hungarian Search Report dated Oct. 11, 2004 (4 pages, in Hungarian, including English translation of Hungarian Search Report).

Chinese Office Action issued Dec. 29, 2006, in counterpart Chinese Application No. 028224361 (15 pages, in Chinese, including complete English translation).

* cited by examiner

METHOD OF AND APPARATUS FOR RECORDING VIDEO DATA, AND INFORMATION STORAGE MEDIUM THEREBY

CROSS-REFERENCE TO RELATED APPLICATIONS

This application claims the benefit of Korean Patent Application Nos. 2001-60239 filed Sep. 27, 2001, and 2002-52287 filed Aug. 31, 2002, in the Korean Intellectual Property Office, the disclosures of which are incorporated herein by reference.

BACKGROUND OF THE INVENTION

1. Field of the Invention

The present invention relates to a method of recording video data, and more particularly, to a method of and an apparatus for receiving video data provided by a camcorder and recording the video data on an information storage medium, and the information storage medium thereby.

2. Description of the Related Art

Camcorders have been widely used. However, the camcorders record video data on a video tape in a format of digital video (DV). However, the video data recorded on the video tape can be only sequentially accessed but cannot be randomly accessed. Furthermore, it is not easy to freely edit the video data recorded on the video tape.

SUMMARY OF THE INVENTION

To solve the above and other problems, it is an object of the present invention to provide a method of and an apparatus for recording video data in a format of digital video (DV) provided by a camcorder on an information storage medium on which the video data can be randomly accessed, and the information storage medium thereby.

It is another object of the present invention to provide a method of and an apparatus for recording video data in a format of digital video (DV) provided by a camcorder on an information storage medium on which the video data can be freely edited, and the information storage medium thereby.

Additional objects and advantageous of the invention will be set forth in part in the description which follows and, in part, will be obvious from the description, or may be learned by practice of the invention.

Accordingly, to achieve the above and other objects, according to an embodiment of the present invention, there is provided a method of recording video data on an information storage medium. The method includes recording the video data in a digital video format (DV format) received from a camcorder in a plurality of clip files, recording navigation data to navigate the clip files in a clip navigation file, recording a program navigation file which represent at least one clip file and at least a part of the corresponding clip navigation file, and recording program information which represents at least one of the program navigation files, in a manager file.

According to an aspect of the present invention, the recording of the video data includes receiving a digital interface format (DIF) sequence that is packaged with an IEEE 1394 packet, and recording the digital interface format (DIF) sequence unpacked from the IEEE 1394 packet, in the plurality of clip files, or recording the digital interface format (DIF) sequence, which is one of DV formats, such as digital video (DV) 25 and 50 formats, and the recording of the video data includes recording the video data substantially in real-time.

According to another aspect of the present invention, the recording of the navigation data includes recording mapping information which maps duration time information on a corresponding clip to address information in which the video data belonging to the corresponding clip is recorded, in the clip navigation file.

According to another aspect of the present invention, the recording of the program navigation file includes recording an identifier of a corresponding clip file, a start time, and an end time representing a duration of the corresponding clip file in the program navigation file.

To achieve the above and other objects, according to another embodiment of the present invention, there is provided a method of recording video data on an information storage medium. The method includes recording the video data in a digital video format (DV format) in a plurality of clip files in real-time, recording navigation data to navigate the clip files in a clip navigation file, recording a program navigation file which represents at least one clip file and at least a part of the corresponding clip navigation file, and recording program information which represents at least one of the program navigation files, in a manager file.

According to another aspect of the present invention, the recording of the navigation data includes recording mapping information which maps duration time information on a corresponding clip to address information in which the video data belonging to the corresponding clip is recorded, in the clip navigation file, or recording a broadcasting format of the vide data in the clip navigation file, and the broadcasting format is an NTSC or PAL mode.

To achieve the above and other objects, according to another embodiment of the present invention, there is provided an apparatus for recording video data in a digital video format (DV format) received from a camcorder on an information storage medium. The apparatus includes a video interface which receives the video data, a recorder which records data including the video data on the information storage medium, and a controller which controls the recorder to record the video data inputted to the video interface in at least one clip file, to record navigation data to navigate the generated clip files in a clip navigation file, to record a program navigation file which represents at least one clip file and at least a part of the corresponding clip navigation file, and to record program information which represents at least one of the program navigation file, in a manager file.

According to another aspect of the present invention, the video interface includes an IEEE 1394 port which receives an IEEE 1394 packet in which a digital interface format (DIF) sequence is packaged, and a buffer which stores the digital interface format (DIF) sequence unpacked from the IEEE 1394 packet.

According to another aspect of the present invention, the video interface receives the digital interface format (DIF) sequence, which is one of DV formats, such as digital video (DV) 25 or 50 formats.

According to another aspect of the present invention, the controller controls the recorder to record the video data received from the video interface in substantially real-time and record mapping information which maps duration time information on a corresponding clip to address information in which the video data belonging to the corresponding clip is recorded, in the clip navigation file.

According to another aspect of the present invention, the controller controls the recorder to record an identifier of a corresponding clip file, a start time, and an end time representing a duration time of the corresponding clip file in the program navigation file.

To achieve the above and other objects, according to another embodiment of the present invention, there is provided an information storage medium. The information storage medium includes a plurality of clip files in which video data in a format of digital video (DV) received from a camcorder is recorded, a navigation file in which navigation data to navigate the clip files is recorded, a program navigation file in which navigation data which represent at least one clip file and at least a part of the corresponding clip navigation file, is recorded, and a manager file in which program information is stored in at least one of the program navigation file.

According to another aspect of the present invention, a digital interface format (DIF) sequence unpacked from the IEEE 1394 packet, is recorded in the clip files, and the digital interface format (DIF) sequence, which is one of digital video (DV) 25 or 50 formats, is recorded in the clip files.

According to another aspect of the present invention, mapping information which maps duration time information on a corresponding clip to address information in which the video data belonging to the corresponding clip is recorded, is recorded in the clip navigation file. Specifically, it is possible that an identifier of a corresponding clip file, a start time, and an end time representing a duration time of the corresponding clip file are recorded in the program navigation file. Further, it is possible that a broadcasting format of the video data recorded in the clip files is recorded in the clip navigation file, and the broadcasting format is an NTSC or PAL mode.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENTS

Figure 1:
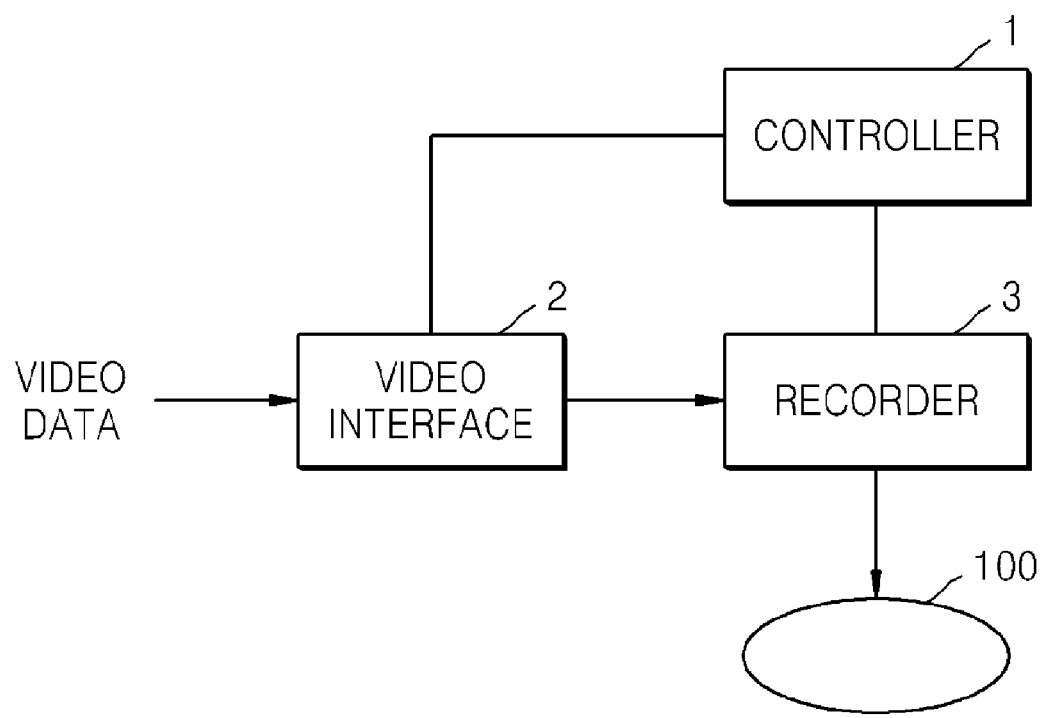
FIG. 1 is a block diagram of an apparatus for recording video data on an information storage medium according to an embodiment of the present invention.

Reference will now be made in detail to the present preferred embodiments of the present invention, examples of which are illustrated in the accompanying drawings, wherein like reference numerals refer to the like elements throughout. The embodiments are described in order to explain the present invention by referring to the figures.

Hereinafter, the present invention will be described in detail by describing embodiments of the invention with reference to the accompanying drawings.

FIG. 1 is a block diagram of an apparatus for recording video data on ah information storage medium according to an embodiment of the present invention. Referring to FIG. 1, the apparatus for recording the video data on the information storage medium includes a controller 1, a video interface 2, and a recorder 3. The video interface 2 receives the video data in a format of digital video (DV) that is one of video and audio recording and reproducing standards to record the video data on a video cassette tape, from a camcorder (not shown). The video data is a digital signal formatted according to the format of DV. The video interface 2 may be implemented with an IEEE 1394 port and a buffer that are connected to the camcorder. The video data in the format of DV is a digital interface format (DIF) sequence that is packaged with an IEEE 1394 packet, is inputted to the IEEE 1394 port, and is stored in the buffer in a form of the DIF sequence unpacked from the IEEE 1394 packet.

The controller 1 reads header information from the DIF sequence inputted to the video interface 2. The header information is information on the inputted DIF sequence and includes an employed video format and an employed broadcasting format (i.e., national television standards committee (NTSC) mode/phase alternation line (PAL) mode). Further, the header information may include information required for decoding an employed compression method, a resolution, and other information. The controller 1 extracts at least a part of the header information and records the part of the header information on an optical disc 100, which is the information storage medium according to the present invention, through the recorder 3. In addition, the controller 1 generates navigation data required to search for or reproduce the video data, and records the navigation data on the optical disc 100 through the recorder 3.

Figure 2:
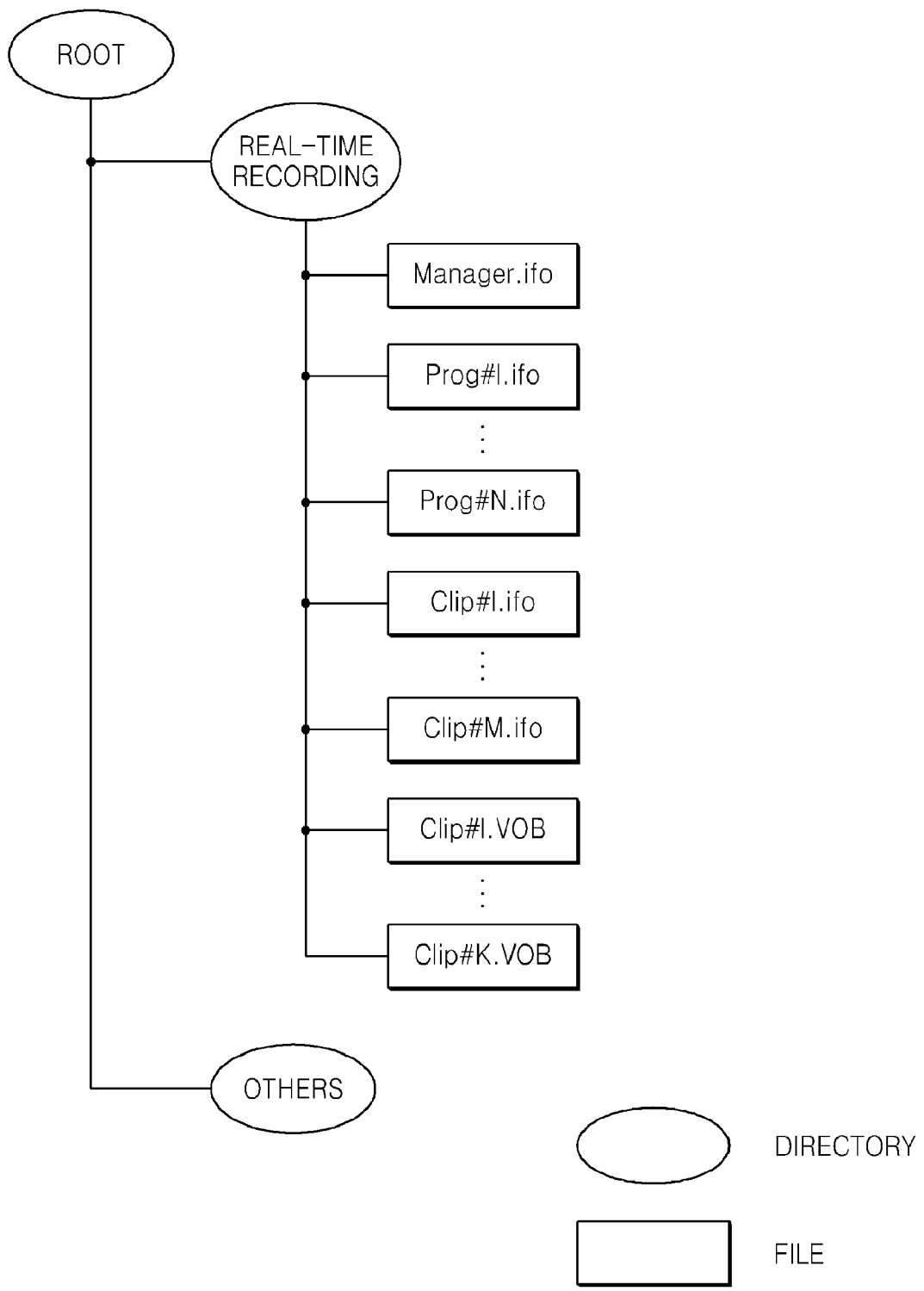
FIG. 2 is a reference diagram illustrating an example of a file structure of an optical disc on which video data are recorded, according to another embodiment of the present invention.

FIG. 2 is a reference diagram illustrating an example of a file structure of an optical disc on which the video data is recorded, according to another embodiment of the present invention. Referring to FIG. 2, a real-time recording directory is provided in a root directory. Files in which the navigation data required to search for or reproduce the video data recorded on the optical disc 100 are recorded, such as Manager.ifo, Program #1.ifo, . . . , Program #N.ifo, Clip #1.ifo, . . . , and Clip #M.ifo, are stored in the real-time recording directory. Other files in which the video data is recorded, such as Clip #1.VOB, . . . , and Clip #K.VOB, are further stored in the real-time recording directory.

General information on the video data recorded on the optical disc 100 may be recorded in a file Manager.ifo. The general information includes information such as the number of programs and a duration time of each program. The navigation data for a number N of programs that are recorded on the optical disc 100, is recorded in the files, e.g., Prog#1.ifo, . . . , and Prog#N.ifo. The navigation data for each of at least one clip included in each program is recorded in the files, e.g., Clip #1.ifo, . . . , and Clip #M.ifo. The video data is recorded in the files Clip #1.VOB, . . . , Clip #K.VOB, and Clip #K+1.VOB.

The program and the clip represent a title and a subtitle of the video data to be shown to a user, respectively. For example, the program means a movie 'Gone with the Wind,' and three clips belonging to the program 'Gone with the Wind' represent first, second, and third parts of the program.

Figure 3:
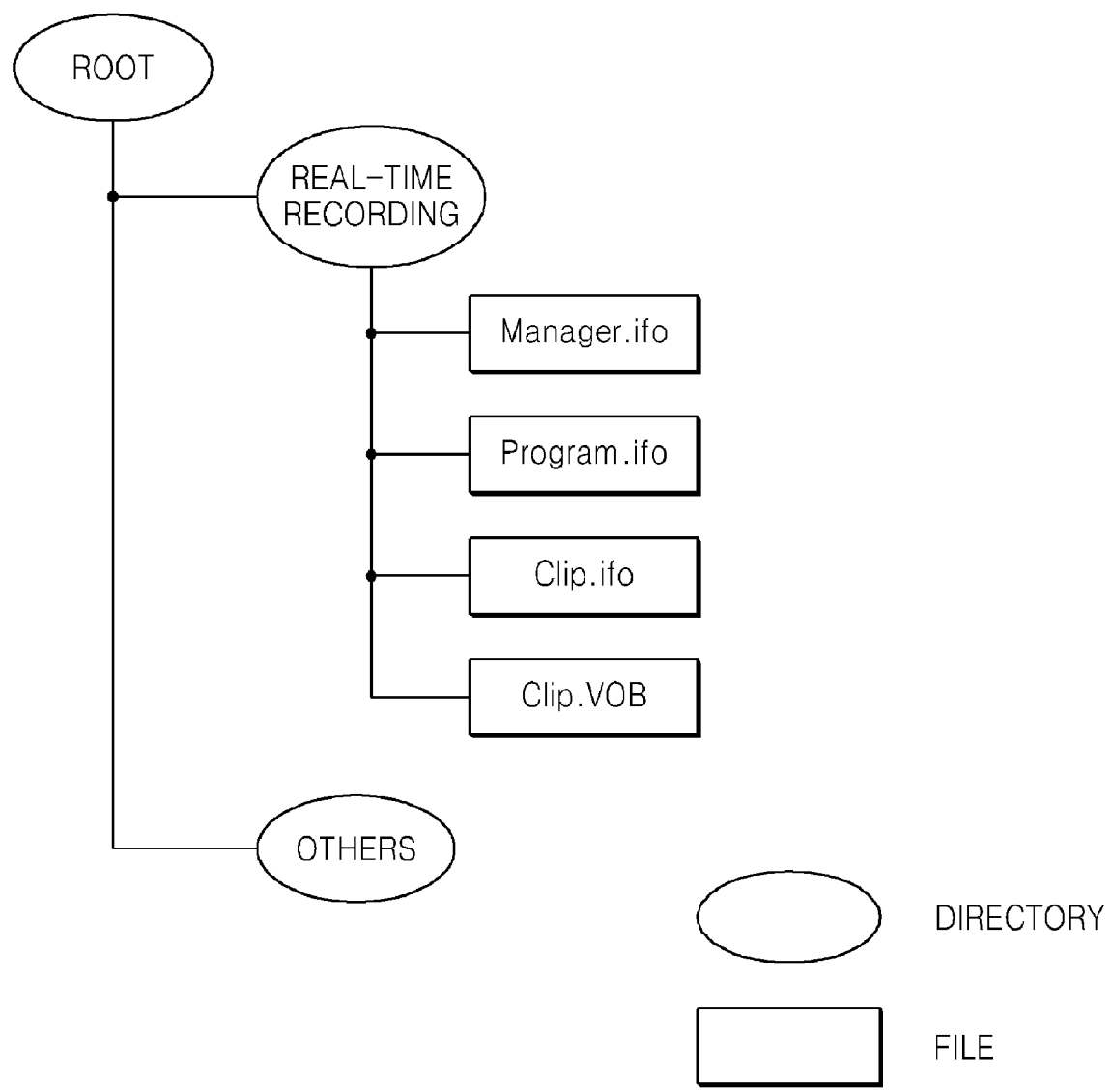
FIG. 3 is a reference diagram illustrating another example of the file structure of the optical disc on which video data are recorded, according to another embodiment of the present invention.

FIG. 3 is a reference diagram illustrating another example of the file structure of the optical disc on which the video data is recorded, according to another embodiment of the present invention. Referring to FIG. 3, the real-time recording directory is provided in the root directory. Files in which the navigation data required to search for or reproduce the video data recorded on the optical disc 100 is recorded, such as Manager.ifo, Program.ifo, and Clip.ifo, are stored in the real-time recordinig directory. A file in which the video data is recorded, such as Clip.VOB, is further stored in the real-time recording directory. Compared to the file structure of FIG. 3 the navigation data for a number N of programs is divided into a number N of files and recorded in the file structure of FIG. 2, whereas the navigation data is incorporated into one file and recorded in the file structure of FIG. 3. The navigation data for a number M of clips is also incorporated into one file to be recorded, and the clips in which the video data is recorded, are also incorporated into one file to be recorded.

When the video data is divided into small files to be recorded, it takes more time to search for a corresponding file, whereas if the corresponding file has been found, desired data can be immediately read. Conversely, when the video data is incorporated into one file to be recorded, the corresponding file can be immediately found, but even if the corresponding file has been found, it takes more time to search for and read the desired data.

Figure 4:
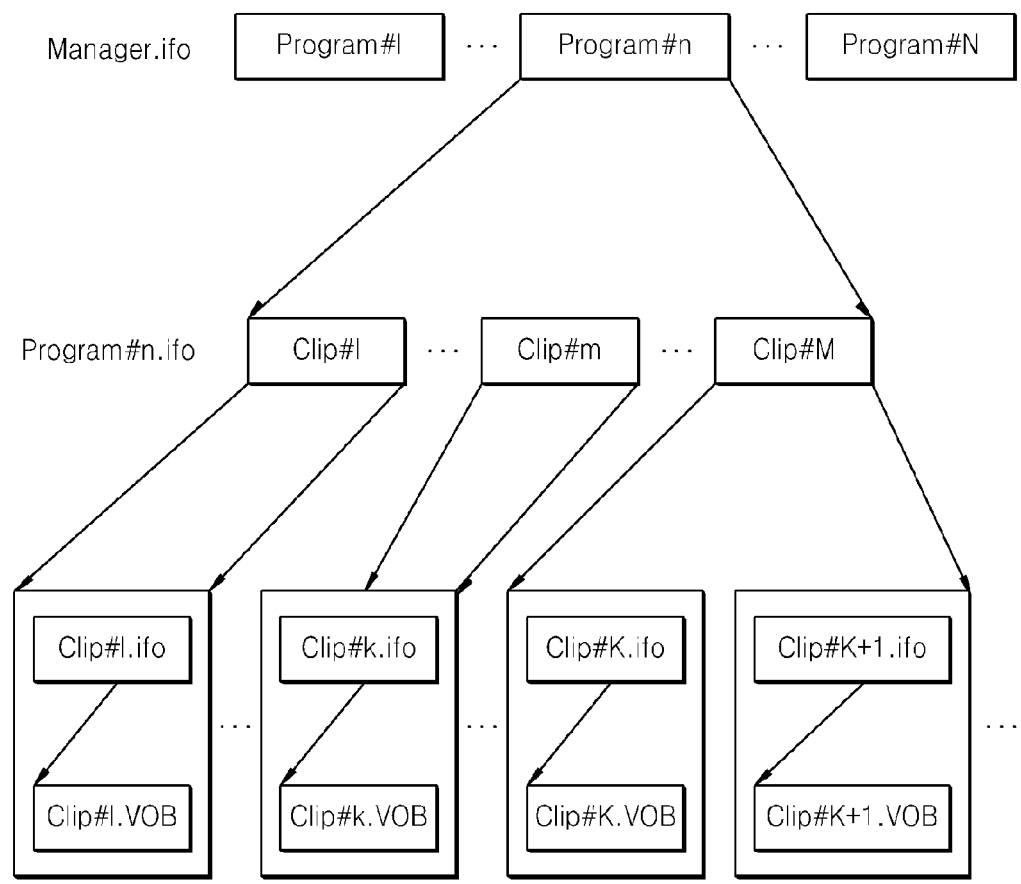
FIG. 4 illustrates a data structure which corresponds to the file structure shown in FIG. 2.

FIG. 4 illustrates data structure which corresponds to the file structure shown in FIG. 2. Referring to FIG. 4, a number N of programs, e.g., Program #1, . . . , Program #n, . . . , and Program #N, are recorded on the optical disc 100. The program Program #n has a number M of clips, e.g., Clip #1, . . . , Clip #m, . . . , and Clip #M. For example, a program called 'Gone with the Wind' has three clips having the first, second, and third parts of the program.

The video data are recorded in predetermined units of data clips, e.g., Clip #1.VOB, . . . , Clip #k.VOB, . . . , Clip #K.VOB, and Clip #K+1.VOB. The data clips Clip #1. VOB, . . . , Clip #k.VOB, . . . , Clip #K.VOB, and Clip #K+1.VOB correspond to information clips (files) Clip #1.ifo, . . . , Clip #k.ifo, . . . , Clip #K.ifo, and Clip #K+1.ifo in which the navigation data is recorded.

Program #n.ifo represents the video data belonging to each of the clips included in the program Program #n. The video data belonging to the clip Clip #1 are recorded in the data clip Clip #1.VOB. The video data belonging to the clip Clip #M are recorded in the data clips Clip #K.VOB and Clip #K+1.VOB. For example, the first part of the program 'Gone with the Wind' is recorded in the data clip Clip #1.VOB, the second part thereof is recorded in the data clip Clip #k.VOB, and the third part thereof is recorded in the data clips Clip #K.VOB and Clip #K+1.VOB.

Figure 5:
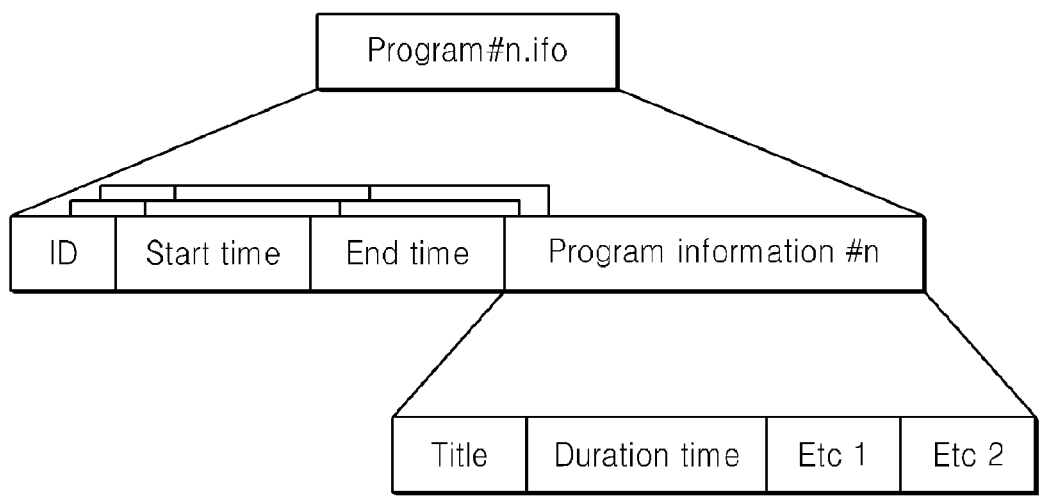
FIG. 5 illustrates a detailed structure of Program #n.ifo shown in FIG. 4.

FIG. 5 illustrates a detailed structure of the Program #n.ifo shown in FIG. 4. Referring to FIG. 5, an identifier ID of a corresponding clip, a start time, and an end time representing a duration time of the clip are recorded in Program #n.ifo. When there are a plurality of the clips, the identifier of the corresponding clip, the start time, and the end time of the duration time of the clip are provided for each clip. In addition, information Program information #n on a corresponding program #n is recorded in Program #n.ifo. Program information #n includes title, the duration time, and other information Etc 1 and Etc2.

Figure 6:
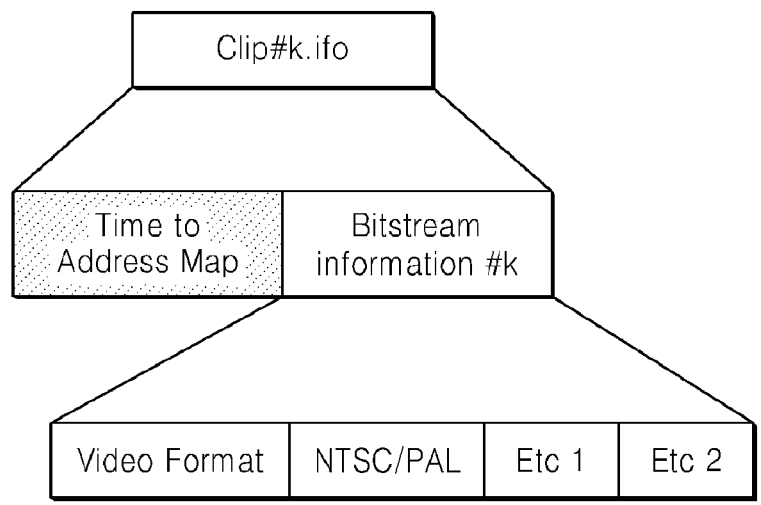
FIG. 6 illustrates a detailed structure of Clip #k.ifo shown in FIG. 4.

FIG. 6 illustrates a detailed structure of the information clip Clip #k.ifo shown in FIG. 4. Referring to FIG. 6, mapping information Time to Address Map which maps duration time information on a corresponding clip to address information in which the video data belonging to the corresponding clip is recorded, and Bitstream information #k, which is information on a bit stream of the corresponding clip, are included in the information clip Clip #k.ifo. The bitstream information #k includes a video format and a broadcasting format. When the video format is the DIF sequence, which is the video data provided by the camcorder, the video format may be recorded in the format of the DV, e.g., DV 25 and DV 50. The DV 25 represents a digital video 25 Mbps format, and the DV 50 represents a digital video 50 Mbps format. When the video format is a MPEG transport stream other than the DIF sequence, the video format may be recorded in the format of MPEG. The broadcasting format may be recorded in the NTSC or PAL mode.

Here, the mapping information Time to Address Map which maps the duration time information on the corresponding clip to the address information in which the video data belonging to the corresponding clip is recorded, is optional because a recording position of the video data of the corresponding clip can be calculated from the video format and the broadcasting format even though the Time to Address Map is not recorded in the optical disc 100.

A method of recording the video data according to another embodiment of the present invention will be described on the basis of the above structure.

Figure 7:
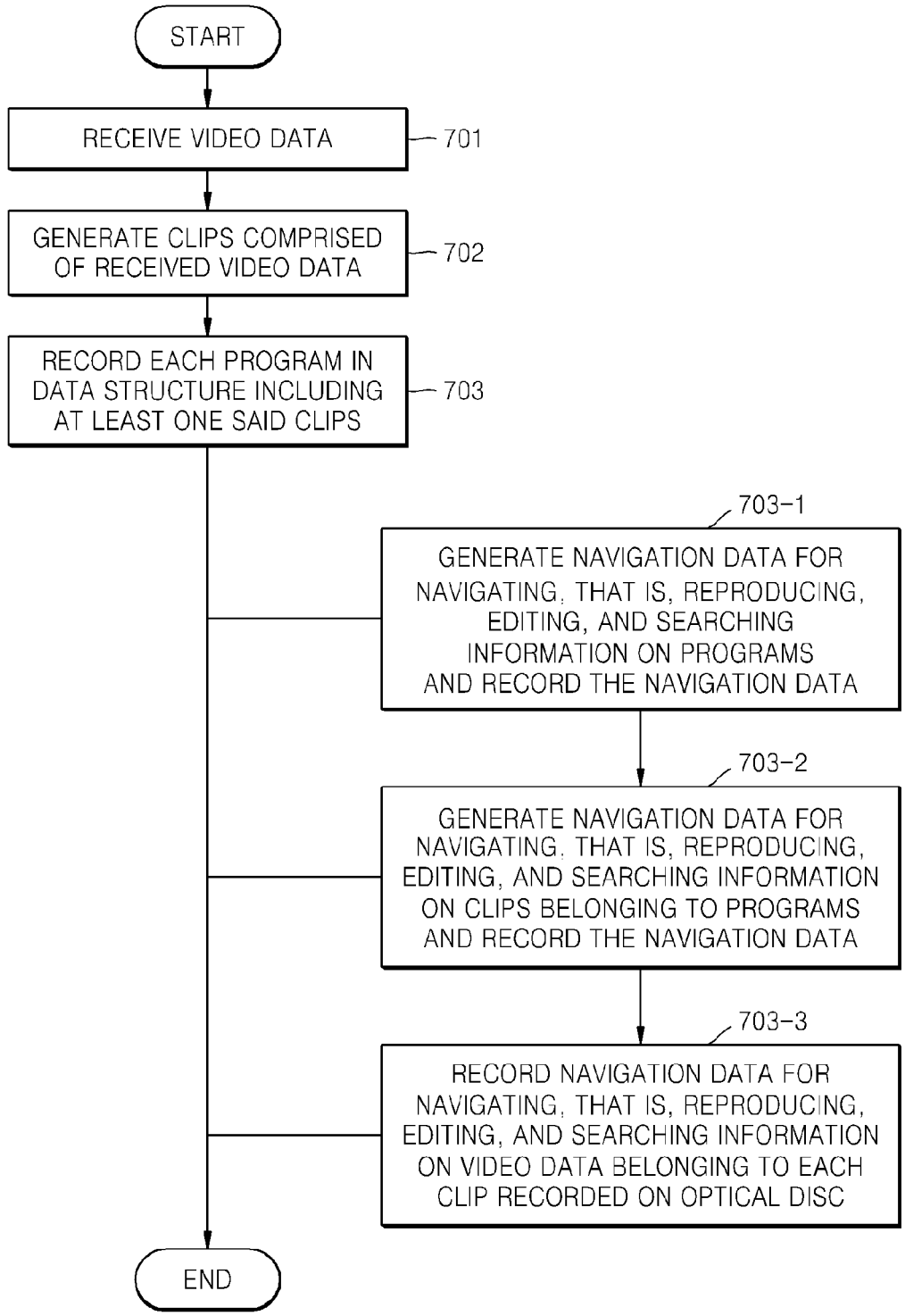
FIG. 7 is a flow chart illustrating a method of recording video data on an information storage medium according to another embodiment of the present invention.

FIG. 7 is a flow chart illustrating the method of recording the video data on the information storage medium. Referring to FIG. 7, in operation 701, the video interface 2 receives the video data. In operation 702, the controller 1 generates clips includes the video data. In operation 703, the controller 1 controls the recorder 3 to record each program in a data structure including at least one clip. That is, the controller 1 generates the navigation data corresponding to the data structure so as to search for or reproduce the recorded programs and controls the recorder 3 to record the programs on the optical disc 100.

In operation 703-1, the controller 1 generates the navigation data for navigating, that is, reproducing, editing, and searching, information on the programs and records the navigation data. In operation 703-2, the controller 1 generates the navigation data for navigating, that is, reproducing, editing, and searching, the information on the clips belonging to the programs and records the navigation data. In operation 703-3, the controller 1 records the navigation data for navigating, that is, reproducing, editing, and searching the information on the video data belonging to each clip recorded on the optical disc 100.

Operation 703-1 includes generating the navigation data including the number and title of the programs and a size of data, operation 703-2 includes generating the navigation data for navigating, that is, reproducing, editing, and searching the identifier ID of the corresponding clip, the start time, and the end time of the duration time of the video data belonging to the corresponding clip, and operation 703-3 includes generating the navigation data for navigating, that is, reproducing, editing, and searching the video format, the broadcasting format, and the navigation data for navigating, that is, reproducing, editing, and searching the recording position corresponding to the start time and the end time.

The optical disc may be a recordable disc or a readable/writable disc. The recording apparatus may be combined with a reproducing apparatus. The reproducing apparatus reproduces data, e.g., the clip, the navigation file, the program file, etc., from the optical disc so as to reproduce the video data of the DV format. The reproducing apparatus includes a reproducing unit, e.g., an optical pickup unit reading data from the optical disc, having the optical disc containing the clip, the navigation file, and the program file, etc. The reproducing apparatus also includes another controller controlling the reproducing unit to read the clip file, the clip navigation file, and the program file from the optical disc to generate the video data.

As described above, according to the present invention, the video data in the format of DV provided by the camcorder can be recorded on the information storage medium on which the video data can be randomly accessed, and the video data can be reproduced at a desired time. Further, the video data in the format of DV provided by the camcorder can be stored in the data structure in which the video data can be freely edited.

While this invention has been particularly shown and described with reference to preferred embodiments thereof, it will be understood by those skilled in the art that various changes in form and details may be made therein without departing from the spirit and scope of the invention as defined by the appended claims and their equivalents.

What is claimed is:

1. A method of recording video data on an information storage medium, the method comprising:
    recording the video data in a digital video format in a plurality of video stream files on the information storage medium;
    recording navigation, data to navigate the video stream files in a clip navigation file on the information storage medium;
    recording a program navigation file on the information storage medium, the program navigation file representing at least one of the video stream files and at least a part of the clip navigation file, and comprising an identifier, a start time, and an end time of the at least one of the video stream files; and
    recording program information representing the program navigation file in a manager file on the information storage medium;
    wherein the clip navigation file on the information storage medium is separate from the video stream files on the information storage medium.

2. The method of claim 1, wherein the video data comprises a digital interface format (DIF) sequence packaged with an IEEE 1394 packet; and
    the recording of the video data comprises:
        receiving the DIF sequence packaged with the IEEE 1394 packet; and
        recording the DIF sequence unpackaged from the IEEE 1394 packet in the video stream files on the information storage medium.

3. The method of claim 1, wherein the video data comprises a digital interface format (DIF) sequence in a digital video (DV) 25 or DV 50 format; and
    the recording of the video data comprises:
        receiving the DIF sequence in the DV 25 or DV 50 format; and
        recording the received DIF sequence in the DV 25 or DV 50 format in the video stream files on the information storage medium.

4. The method of claim 1, wherein the clip navigation file comprises mapping information that maps duration time information on a corresponding one of the video stream files to address information in which video data belonging to the corresponding one of the video stream files is recorded.

5. The method of claim 1, wherein the video stream files, the clip navigation file, the program navigation file, and the manager file are all separate from one another on the information storage medium.

6. A method of recording video data on an information storage medium, the method comprising:
    recording the video data in a digital video format substantially in real-time in a plurality of video stream files on the information storage medium;
    recording navigation data to navigate the video stream files in a clip navigation file on the information storage medium;
    recording a program navigation file on the information storage medium, the program navigation file representing at least one of the video stream files and at least a part of the clip navigation file, and comprising an identifier, a start time, and an end time of the at least one of the video stream files; and
    recording program information representing the program navigation file in a manager file on the information storage medium;
    wherein the clip navigation file on the information storage medium is separate from the video stream files on the information storage medium.

7. The method of claim 6, wherein the clip navigation file comprises mapping information that maps duration time information on a corresponding one of the video stream files to address information in which video data belonging to the corresponding one of the video stream files is recorded.

8. The method of claim 6, wherein the clip navigation file comprises a broadcasting format of the video data.

9. The method of claim 8, wherein the broadcasting format is an NTSC format or a PAL format.

10. The method of claim 6, wherein the video stream files, the clip navigation file, the program navigation file, and the manager file are all separate from one another on the information storage medium.

11. An apparatus for recording video data in a digital video format on an information storage medium, the apparatus comprising:
    a video interface to receive the video data in the digital video format;
    a recorder to record data on the information storage medium; and
    a controller to control the recorder to:
        record the video data in the digital video format received by the video interface in a plurality of video stream files on the information storage medium;
        record navigation data to navigate the video stream files in a clip navigation file on the information storage medium;
        record a program navigation file on the information storage medium, the program navigation file representing at least one of the video stream files and at least a part of the clip navigation file, and comprising an identifier, a start time, and an end time of the at least one of the video stream files; and
        record program information representing the program navigation file in a manager file on the information storage medium;
    wherein the clip navigation file on the information storage medium is separate from the video stream files on the information storage medium.

12. The apparatus of claim 11, wherein the video interface comprises:
    an IEEE 1394 port to receive as the video data a digital interface format (DIF) sequence packaged with an IEEE packet; and
    a buffer to store the DIF sequence unpackaged from the IEEE 1394packet.

13. The apparatus of claim 11, wherein the video interface receives as the video data a digital interface format (DIF) sequence in a digital video (DV) 25 format or a DV 50 format.

14. The apparatus of claim 11, wherein the controller controls the recorder to record the video data received by the video interface substantially in real-time in the video stream files on the information recording medium.

15. The apparatus of claim 11, wherein the clip navigation file comprises mapping information that maps duration time information on a corresponding one of the video stream files to address information in which video data belonging to the corresponding one of the video stream files is recorded.

16. The apparatus of claim 11, wherein the video stream files, the clip navigation file, the program navigation file, and the manager file are all separate from one another on the information storage medium.

17. A non-transitory information storage medium encoded with data reproducible by a reproducing apparatus or a recording and reproducing apparatus, the data comprising:
a plurality of video stream files recorded on the non-transitory information storage medium, the video stream files comprising video data in a digital video format;
a clip navigation file recorded on the non-transitory information storage medium, the clip navigation file comprising navigation data to navigate the video stream files;
a program navigation file recorded on the non-transitory information storage medium, the program navigation file representing at least one of the video stream files and at least a part of the clip navigation file, and comprising an identifier, a start time, and an end time of the at least one of the video stream files; and
a manager file recorded on the non-transitory information storage medium, the manager file comprising program information representing the program navigation file;
wherein the clip navigation file on the non-transitory information storage medium is separate from the video stream files on the non-transitory information storage medium.

18. The non-transitory information storage medium of claim 17, wherein the video data of the video stream files comprises a digital interface format (DIF) sequence unpackaged from an IEEE 1394 packet.

19. The non-transitory information storage medium of claim 17, wherein the video data of the video stream files comprises a digital interface format (DIF) sequence in a digital video (DV) 25 or DV 50 format.

20. The non-transitory information storage medium of claim 17, wherein the clip navigation file comprises mapping information that maps duration time information on a corresponding one of the video stream files to address information in which video data belonging to the corresponding one of the video stream files is recorded.

21. The non-transitory information storage medium of claim 17, wherein the clip navigation file comprises a broadcasting format of the video data of the video stream files.

22. The non-transitory information storage medium of claim 21, wherein the broadcasting format is an NTSC format or a PAL format.

23. The non-transitory information storage medium of claim 17, wherein the video stream files, the clip navigation file, the program navigation file, and the manager file are all separate from one another on the non-transitory information storage medium.

24. An apparatus in an optical recording apparatus compatible with an optical disc, the apparatus comprising:
a video interface to receive video data in a digital video (DV) format;
a recorder; and
a controller to:
control the recorder to record the DV format video data received by the video interface on the optical disc in a plurality of video stream files;
generate a clip navigation comprising navigation data to navigate the video stream files on the optical disc;
generate a program navigation file representing at least one of the video stream files and the clip navigation file, the program navigation file comprising an identifier, a start time, and an end time of the at least one of the video stream files; and
control the recorder to record the clip navigation file and the program navigation file on the optical disc;
wherein the clip navigation file on the optical disc is separate from the video stream files on the optical disc.

25. The apparatus of claim 24, further comprising:
a reproducing unit; and
a controller to control the reproducing unit to read the video stream files, the clip navigation file, and the program file from the optical disc to generate the DV format video data.

26. The apparatus of claim 24, wherein the video stream files, the clip navigation file, and the program navigation file are all separate from one another on the optical disc.

27. An apparatus in an optical recording apparatus, the apparatus comprising:
a video interface to receive video data in a digital video (DV) format; and
a controller to generate:
video stream files comprising the DV format video data;
a clip navigation file comprising navigation data to navigate the video stream files; and
a program navigation file representing at least one of the video stream files and the clip navigation file, and comprising an identifier, a start time, and an end time of the at least one of the video stream files;
wherein the clip navigation file is separate from the video stream files.

28. The apparatus of claim 27, wherein the optical recording apparatus comprises a recorder compatible with an optical disc; and
the controller controls the recorder to record the video stream file, the clip navigation file, and the program navigation file on the optical disc;
wherein the clip navigation file on the optical disc is separate from the video stream files on the optical disc.

29. The apparatus of claim 28, wherein the video stream files, the clip navigation file, and the program navigation file are all separate from one another on the optical disc.

30. The apparatus of claim 27, wherein the video stream files, the clip navigation file, and the program navigation file are all separate from one another.

* * * * *